United States Patent
Lin et al.

(10) Patent No.: US 12,080,055 B2
(45) Date of Patent: Sep. 3, 2024

(54) MULTI-TASK SELF-TRAINING FOR LEARNING GENERAL REPRESENTATIONS

(71) Applicant: Google LLC, Mountain View, CA (US)

(72) Inventors: Tsung-Yi Lin, Sunnyvale, CA (US); Barret Zoph, Sunnyvale, CA (US); Ekin Dogus Cubuk, Sunnyvale, CA (US); Golnaz Ghiasi, Mountain View, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 351 days.

(21) Appl. No.: 17/697,750

(22) Filed: Mar. 17, 2022

(65) Prior Publication Data

US 2022/0301298 A1 Sep. 22, 2022

Related U.S. Application Data

(60) Provisional application No. 63/162,467, filed on Mar. 17, 2021.

(51) Int. Cl.
| | |
|---|---|
| G06V 10/82 | (2022.01) |
| G06N 3/084 | (2023.01) |
| G06V 10/764 | (2022.01) |
| G06V 10/77 | (2022.01) |
| G06V 10/774 | (2022.01) |
| G06V 10/776 | (2022.01) |
| G06V 10/80 | (2022.01) |

(52) U.S. Cl.
CPC .............. *G06V 10/82* (2022.01); *G06N 3/084* (2013.01); *G06V 10/764* (2022.01); *G06V 10/7715* (2022.01); *G06V 10/774* (2022.01); *G06V 10/776* (2022.01); *G06V 10/806* (2022.01)

(58) Field of Classification Search
CPC .... G06N 3/0464; G06N 3/084; G06N 3/0895; G06N 3/09; G06V 10/764; G06V 10/7715; G06V 10/774; G06V 10/776; G06V 10/806; G06V 10/82
See application file for complete search history.

(56) References Cited

FOREIGN PATENT DOCUMENTS

CN 110889325 A * 3/2020 ........... G06F 18/214

OTHER PUBLICATIONS

Becker et al., "Self-organizing neural network that discovers surfaces in random-dot stereograms," Nature, 1992, 355(6356):161-163.
Caruana, "Multitask learning.," Machine learning, 1997, 28(1):41-75.
Chen et al., "A simple framework for contrastive learning of visual representations," arXiv, 2020, 11 pages.
Chen et al., "GradNorm: Gradient normalization for adaptive loss balancing in deep multitask networks," JMLR, 2018, 10 pages.
Chen et al., "Just pick a sign: Optimizing deep multitask models with gradient sign dropout," NeurIPS, 2020, 12 pages.
Chen et al., "Naive-student: Leveraging semi-supervised learning in video sequences for urban scene segmentation," ECCV, Nov. 5, 2020, 19 pages.

(Continued)

*Primary Examiner* — Mekonen T Bekele
(74) *Attorney, Agent, or Firm* — Fish & Richardson P.C.

(57) ABSTRACT

Methods, systems, and apparatus, including computer programs encoded on computer storage media, for training an image representation neural network.

20 Claims, 4 Drawing Sheets

(56) References Cited

OTHER PUBLICATIONS

Clark et al., "Bam! born-again multi-task networks for natural language understanding," arXiv, Jul. 10, 2019, 7 pages.
Dosovitskiy et al., "An image is worth 16x16 words: Transformers for image recognition at scale," arXiv, Jun. 3, 2021, 22 pages.
Everingham et al., "The pascal visual object classes (voc) challenge," IJCV, 2010, 88: 303-338.
Girshick, "Fast r-cnn," ICCV, 2015, 9 pages.
Goyal et al., "Accurate, large minibatch SGD: training imagenet in 1 hour," arXiv, 2018, 12 pages.
Grill et al., "Bootstrap your own latent: A new approach to self-supervised learning, " NeurIPS, 2020, 14 pages.
He et al., "Deep residual learning for image recognition," Proceedings of the IEEE Conference on Computer Vision and Pattern Recognition, 2016, 9 pages.
He et al., "Momentum contrast for unsupervised visual representation learning," Proceedings of the IEEE/CVF Conference on Computer Vision and Pattern Recognition, 2020, 10 pages.
He et al., "Rethinking imagenet pre-training," Proceedings of the IEEE/CVF International Conference on Computer Vision, 2019, 10 pages.
Henaff et al., "Data-efficient image recognition with contrastive predictive coding," arXiv, 2019, 11 pages.
Hinton et al., "Distilling the knowledge in a neural network," arXiv, 2015, 9 pages.
Jing et al., "Self-supervised visual feature learning with deep neural networks: A survey," arXiv, Feb. 16, 2019, 24 pages.
Kirillov et al., "Panoptic segmentation," Proceedings of the IEEE/CVF Conference on Computer Vision and Pattern Recognition (CVPR), Jun. 2019, pp. 9404-9413.
Kokkinos, "Ubernet: Training a universal convolutional neural network for low-, mid-, and high-level vision using diverse datasets and limited memory," Proceedings of the IEEE Conference on Computer Vision and Pattern Recognition, 2017, 10 pages.
Kolesnikov et al., "Big transfer (bit): General visual representation learning," European Conference on Computer Vision, Oct. 29, 2020, 17 pages.
Krizhevsky," Learning multiple layers of features from tiny images," Technical report, Apr. 8, 2009, 60 pages.
Lee et al., "Pseudo-label: The simple and efficient semi-supervised learning method for deep neural networks," Workshop on challenges in representation learning, 2013, 6 pages.
Li et al., "An analysis of pre-training on object detection," arXiv, Apr. 11, 2019, 11 pages.
Lin et al., "Feature pyramid networks for object detection," Proceedings of the IEEE Conference on Computer Vision and Pattern Recognition, 2017, 9 pages.
Lin et al., "Microsoft coco: Common objects in context," arXiv, Feb. 21, 2015, 15 pages.
Liu et al., "Improving multi-task deep neural networks via knowledge distillation for natural language understanding," arXiv, Apr. 20, 2019, 8 pages.
Mahajan et al., "Exploring the limits of weakly supervised pretraining," Proceedings of the European Conference on Computer Vision, Sep. 2018, 16 pages.
Misra et al., "Self-supervised learning of pretext-invariant representations," Proceedings of the IEEE/CVF Conference on Computer Vision and Pattern Recognition, Jun. 2020, 11 pages.
Purushwalkam et al., "Demystifying contrastive self-supervised learning: Invariances, augmentations and dataset biases," Advances in Neural Information Processing Systems, 2020, 12 pages.
Raffel et al., "Exploring the limits of transfer learning with a unified text-to-text transformer," The Journal of Machine Learning Research, Jun. 2020, 21(1):5485-5551.
Ranftl et al., "Towards robust monocular depth estimation: Mixing datasets for zero-shot cross-dataset transfer," IEEE Transactions on Pattern Analysis and Machine Intelligence (TPAMI), 2020, 14 pages.
Rosenberg et al., "Semi-supervised self-training of object detection models, " IEEE Workshops on Applications of Computer Vision, 2005, 8 pages.
Ruder, "An overview of multi-task learning in deep neural networks, " arXiv, Jun. 15, 2017, 14 pages.
Russakovsky et al., "Imagenet large scale visual recognition challenge," IJCV, 2015, 42 pages.
Scudder, "Probability of error of some adaptive patternrecognition machines," IEEE Transactions on Information Theory, 1965, 11(3):363-371.
Shao et al., "Objects365: A large-scale, high-quality dataset for object detection," Proceedings of the IEEE/CVF International Conference on Computer Vision, 2019, 10 pages.
Silberman et al., "Indoor segmentation and support inference from rgbd images," ECCV, 2012, 14 pages.
Sun et al., "Revisiting unreasonable effectiveness of data in deep learning era," Proceedings of the IEEE International Conference on Computer Vision, 2017, 10 pages.
Tian et al., "Contrastive multiview coding," ECCV, 2019, 18 pages.
Vasiljevic et al., "Diode: A dense indoor and outdoor depth dataset," arXiv, Aug. 29, 2019, 8 pages.
Wang et al., "Towards universal object detection by domain attention," Proceedings of the IEEE Conference on Computer Vision and Pattern Recognition, 2019, pp. 7289-7298.
Xie et al., "Self-training with noisy student improves imagenet classification," Proceedings of the IEEE/CVF Conference on Computer Vision and Pattern Recognition, Jun. 2020, 12 pages.
Xue et al., "mt5: A massively multilingual pre-trained text-totext transformer," arXiv, Mar. 11, 2021, 17 pages.
Yalniz et al., "Billion-scale semi-supervised learning for image classification," arXiv, May 2, 2019, 12 pages.
Yarowsky, "Unsupervised word sense disambiguation rivaling supervised methods," ACL, 1995, 8 pages.
Yu et al., "Gradient surgery for multi-task learning," arXiv, 2020, 13 pages.
Zamir et al., "Taskonomy: Disentangling task transfer learning," Proceedings of the IEEE Conference on Computer Vision and Pattern Recognition, Jun. 2018, 11 pages.
Zhao et al., "Object detection with a unified label space from multiple datasets," arXiv, Aug. 15, 2020, 16 pages.
Zhou et al., "Semantic understanding of scenes through the ade20k dataset," IJCV, 2019, 127(3):302-321.
Zoph et al., "Rethinking pre-training and self-training," arXiv, Nov. 15, 2020, 20 pages.

\* cited by examiner

MULTI-TASK SELF-TRAINING FOR LEARNING GENERAL REPRESENTATIONS

CROSS-REFERENCE TO RELATED APPLICATION

This application claims priority to U.S. Provisional Application No. 63/162,467, filed on Mar. 17, 2021. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains an image representation neural network. The image representation neural network has learnable parameters (referred to as image representation parameters) and is configured to receive as input an image and to process the image in accordance with the image representation parameters to generate as output a set of feature maps characterizing the image.

Particular embodiments of the subject matter described in this specification can be implemented so as to realize one or more of the following advantages.

Learning universal visual representations that can be generalized across multiple different computer vision tasks is a long-standing challenge in computer vision. Despite the fast progress in training specialized models for a wide variety of datasets and tasks, learning a single general model that works well for many tasks is still challenging. The described techniques make use of multi-task self-training (MuST), which harnesses the knowledge in several independent specialized teacher models (e.g., a model trained to perform image classification on a large data set that has image classification labels) to train a single general student model ("image representation neural network"). Feature representations generated from feature maps output by the student model can then be effectively used for many different computer vision tasks, including image recognition (classification, detection, segmentation) and 3D geometry estimation (depth and surface normal estimation). MuST is scalable with unlabeled or partially labeled datasets and outperforms specialized supervised models and a self-supervised model when training on a variety of datasets. Thus, the described techniques can effectively aggregate unlabeled and, in some cases, labeled training data for learning general feature representations of images.

By training the image representation neural network using MuST, the image representation neural network can then be used for one of the multiple tasks and achieve performance that exceeds that of the specialized teacher model for the task.

Alternatively or in addition, when a new task is required, a new neural network that includes the image representation neural network and an output neural network that is specific to the new task can be trained on very little data while still achieving quality performance on the new task, i.e., because the image representation neural network has already learned to generate general feature representations by virtue of being trained using MuST that the output neural network can quickly learn to repurpose for the new task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
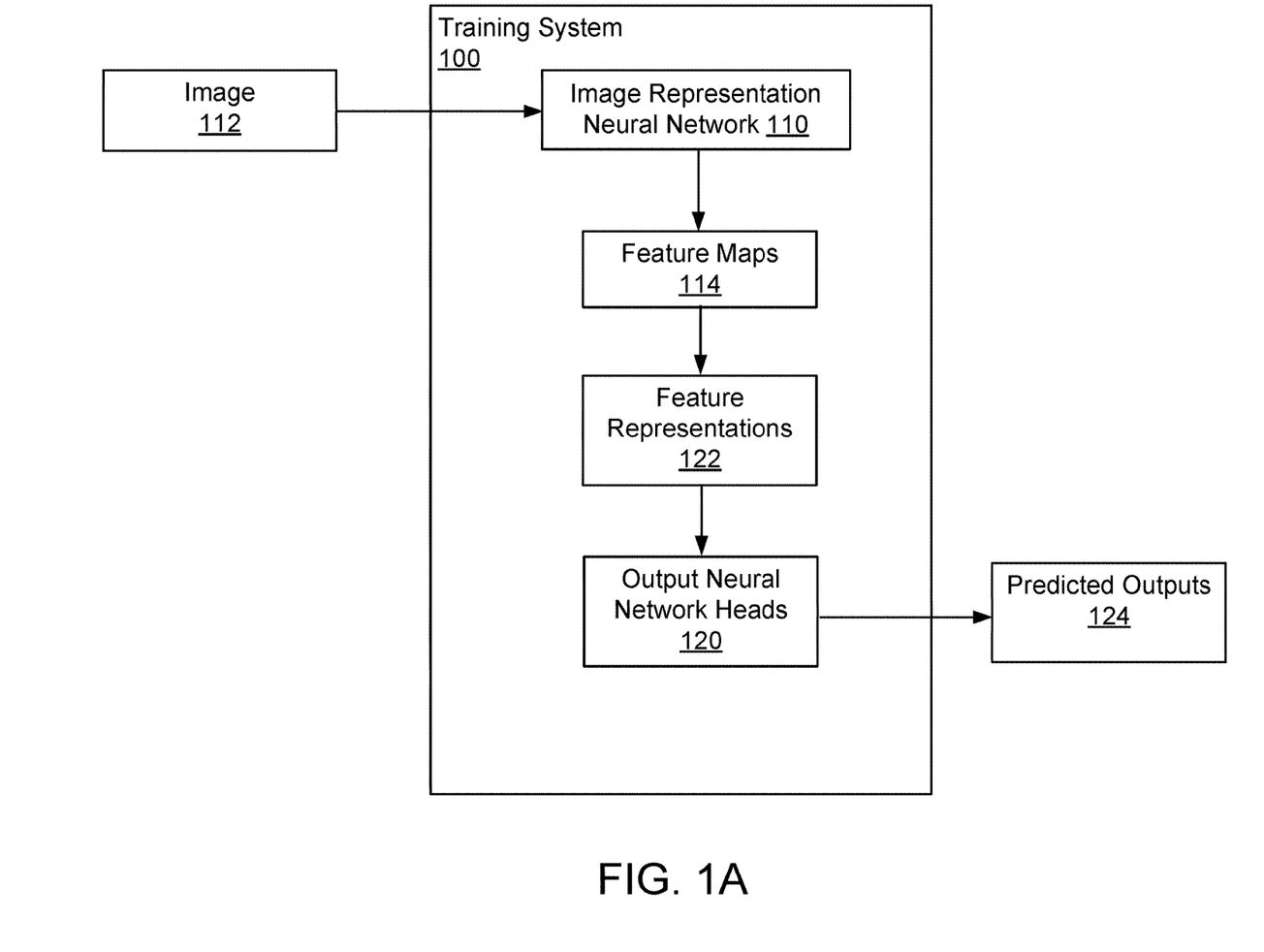
FIG. 1A shows an example training system.

FIG. 1A shows an example training system 100. The training system 100 is an example of a system implemented as computer programs on one or more computers in one or more locations, in which the systems, components, and techniques described below can be implemented.

The system 100 trains an image representation neural network 110. The image representation neural network 110 has learnable parameters (referred to as "image representation parameters") and is configured to receive as input an image 112 and to process the image 112 in accordance with the image representation parameters to generate as output a set of feature maps 114 characterizing the image 112.

The image 112 can be any appropriate type of image. For example, the image can be a two-dimensional image, e.g., a two-dimensional image that has multiple channels (e.g., an RGB image). As another example, the image can be a hyperspectral image that represents a continuous spectrum of wavelengths, e.g., by identifying, for each pixel in the image, a distribution over the spectrum. As another example, the image can be a point cloud that includes multiple points, where each point has a respective coordinate, e.g., in a three-dimensional or a higher-dimensional coordinate space; as a particular example, the image can be a point cloud generated by a LIDAR sensor. As another example, the image can be a medical image generating by a medical imaging device; as particular examples, the image can be a computer tomography (CT) image, a magnetic resonance imaging (MM) image, an ultrasound image, an X-ray image, a mammogram image, a fluoroscopy image, or a positron-emission tomography (PET) image.

Each feature map 114 has a respective spatial resolution and a respective number of channels. That is, each feature map is an h×w×c tensor that includes a respective c dimensional feature at each location in an h×w grid. Different feature maps in the set can have different spatial resolutions, i.e., different values for h and w, different numbers of channels, i.e., different values for c, or both, from some or all of the other feature maps in the set. In some cases, each feature map 114 has a different spatial resolution from each other feature map while, in some other cases, two or more of the feature maps 114 in the set can have the same spatial resolution.

Figure 1B:
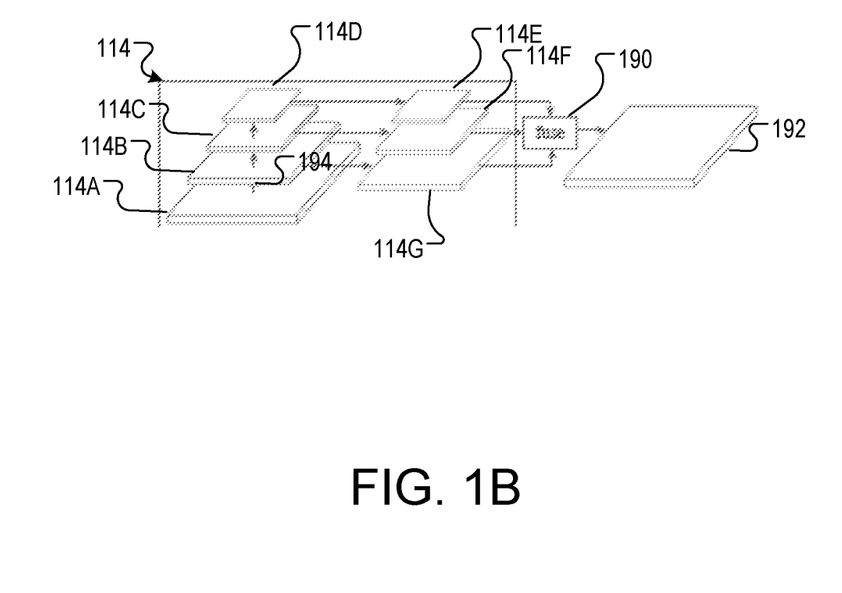
FIG. 1B shows an example of a set of feature maps generated by the image representation neural network.

FIG. 1B shows an example set of feature maps 114 that are generated by the image representation neural network 110 by processing an image 112.

As shown in FIG. 1B, the set of feature maps 114 includes seven feature maps 114A, 114B, 114C, 114D, 114E, 114F, and 114G, with feature maps 114B and 114G having the same spatial resolution, feature maps 114C and 114F having the same spatial resolution, and feature maps 114D and 114E having the same spatial resolution.

The image representation neural network 110 can have any appropriate architecture that allows the neural network to process an image 112 to generate a set of multiple feature maps 114. As one example, the image representation neural network 110 can be a convolutional neural network, e.g., one that has a ResNet or Inception-based architecture. As a specific example, feature maps like those shown in FIG. 1B can be generated by a convolutional neural network, e.g., a ResNet, backbone that employs feature pyramid networks (FPN) to generate multiple different feature maps at multiple different spatial scales.

The system trains the image representation neural network 110 so that representations generated from the feature maps 114 generated by the neural network 110 can be used for multiple different computer vision tasks.

In particular, the system 100 trains the neural network 110 on a loss function that measures the performance of representations generated from the feature maps 114 on multiple different computer vision tasks. That is, during the training, the system 100 generates multiple different feature representations from the same set of feature maps and then uses a multi-task learning loss function to measure the quality of those feature representations across multiple different computer vision tasks.

The multiple different computer vision tasks can include any of a variety of tasks.

For example, the tasks can include one or more image classification tasks. In an image classification task, the output generated by the neural network for a given image is scores for each of a set of object categories, with each score representing an estimated likelihood that the image contains an image of an object belonging to the category.

As another example, the tasks can include one or more object detection tasks. In an object detection task, the output generated by the neural network identifies locations, e.g., bounding boxes or other regions, in the input image at which particular types of objects are depicted.

As another example, the tasks can include one or more instance segmentation tasks. In an instance segmentation task, the output generated by the neural network identifies, for each pixel in the image that belongs to a particular object type, the object instance that the pixel corresponds to.

As another example, the tasks can include one or more semantic segmentation tasks. In a semantic segmentation task, the output generated by the neural network identifies, for each pixel in the image, which of multiple categories the pixel belongs to.

As another example, the tasks can include one or more depth prediction tasks. In a depth prediction task, the output generated by the neural network identifies, for each pixel in the image, a predicted depth of the scene at the pixel.

As another example, the tasks can include one or more surface normal prediction tasks. In a surface normal prediction task, the output generated by the neural network identifies, for each pixel in the image, a predicted surface normal of the scene at the pixel.

In some cases, the tasks can be grouped into categories, e.g., with one category being classification tasks, another category being object detection and instance segmentation tasks, and another category being per-pixel prediction tasks, e.g., semantic segmentation, depth prediction, and surface normal prediction.

To train the image representation neural network 110, the system 100 makes use of a respective output neural network head 120 corresponding to each of the multiple computer vision tasks that are measured by the loss function.

An output neural network head 120 for a given computer vision task is a collection of one or more neural network layers that are configured to receive a feature representation 122 for the corresponding task and to generate a predicted output for the corresponding task 124. That is, each computer vision task has a corresponding, different output head 120 and the system 100 generates an output 124 for the computer vision task by processing the feature representation 122 for the computer vision task using the output head for the computer vision task.

The feature representations 122 for the computer vision tasks are each generated from the feature maps 114. That is, for a single image 102, the system 100 generates multiple different feature representations 122, one for each of the multiple computer vision tasks. The feature representations 122 for different types of computer vision tasks can be different but can be generated from the same set of feature maps 114.

In some implementations, the system 100 generates different feature representations 122 for different categories of computer vision tasks.

For example, returning to the example of FIG. 1B, for classification tasks, the system 100 can generate the feature representation as being equal to the feature maps 114D or 114E, i.e., one of the top-level, lowest spatial resolution feature maps.

For detection and instance segmentation tasks, the system 100 can use a multi-scale feature representation, e.g., one that includes the feature maps 114F, 114G, and 114H.

For pixel-wise prediction tasks, the system 100 can fuse 190 the feature maps 114F, 114G, and 114H into a fused feature map 192 and use the fused feature map 192 as the feature representation. To fuse 192 the feature maps, the system 100 can rescale all feature maps to have the required spatial resolution and then sum the rescaled feature maps.

The output neural network head 120 for any given computer vision task can have any appropriate architecture that allows the head 120 to map a feature representation 122 for the computer vision task to an output for the task. For example, a given output head 120 can include any of fully-connected layers, convolutional layers, pooling layers, softmax layers, logistic nodes, and so on.

Training the neural network 110 on multiple computer vision tasks is described below with reference to FIGS. 2-3.

Figure 2:
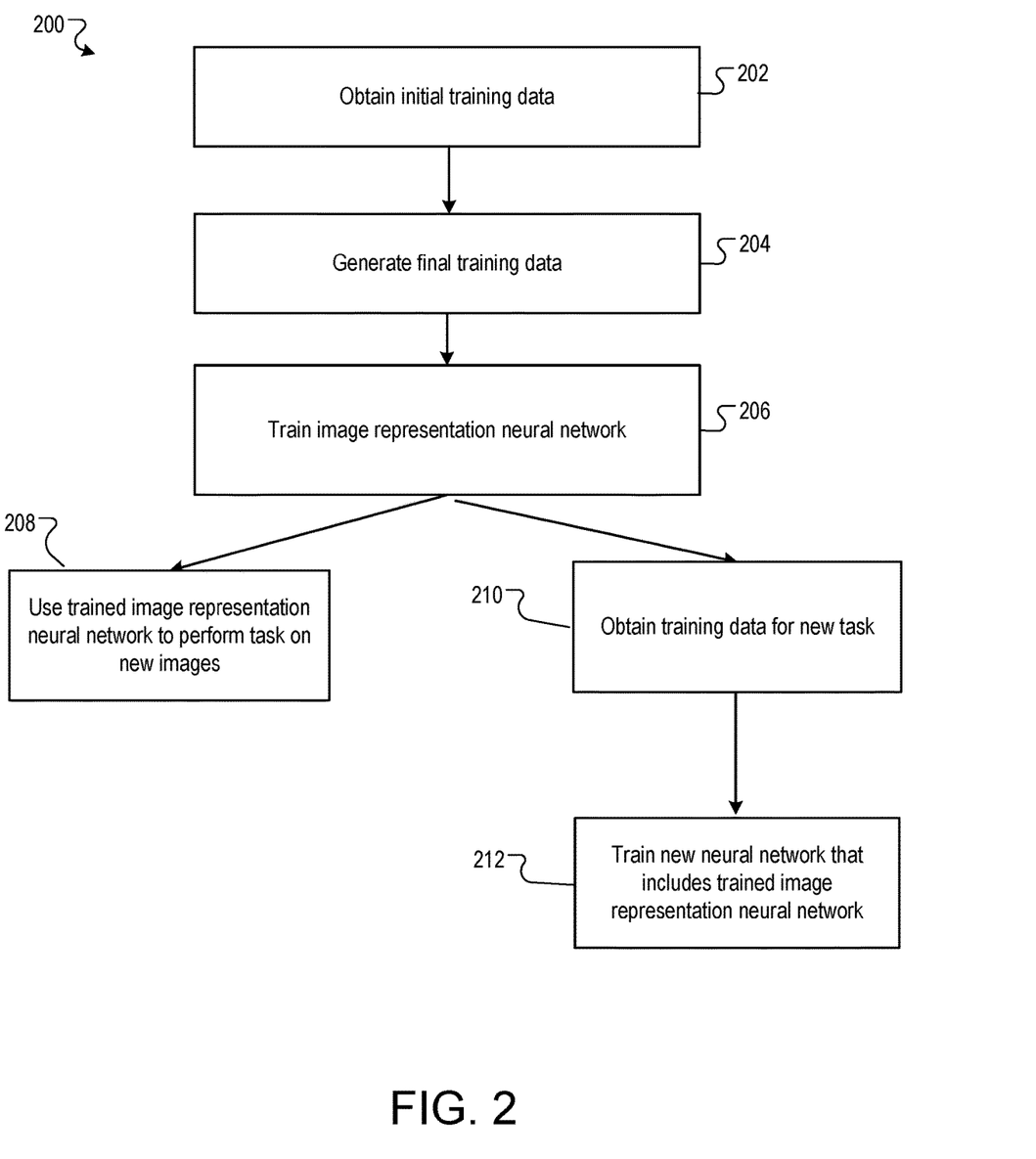
FIG. 2 is a flow diagram of an example process for training the image representation neural network.

FIG. 2 is a flow diagram of an example process 200 for training an image representation neural network. For convenience, the process 200 will be described as being performed by a system of one or more computers located in one or more locations. For example, a training system, e.g., the training system 100 of FIG. 1A, appropriately programmed, can perform the process 200.

In particular, the system performs the process 200 to train the image representation neural network to generate feature representations that can be used to achieve high-quality performance for each computer vision task in a set of multiple different computer vision tasks.

The system obtains initial training data for training the image representation neural network (step 202).

The initial training data includes multiple different training images. In some cases, some of the training images will be associated with ground-truth labels for each of the multiple different computer vision tasks. A ground-truth (or "supervised") label identifies an actual output for the given computer vision task as determined by an external source, e.g., a human user.

Generally, however, a large number of the different training images will not have ground-truth labels for at least one of the computer vision tasks.

For example, the initial training data can include a data set of unlabeled images, i.e., labels that do not have labels for any of the multiple tasks.

As another example, the initial training data can include a data set of partially labeled images, i.e., labels that have labels for one or more of the tasks but do not have labels for at least one of the tasks. For example, the partially labeled images can be images used for training one of the teacher neural networks described below, and therefore only have labels for the task that the teacher neural network was configured to perform.

The system generates, from the initial training data, final training data for training the image representation neural network (step 204).

In particular, for each training image in the training data, the system determines whether the training image is missing a ground-truth label for any of the multiple tasks.

If the training image is missing a ground-truth label for any given task, the system processes the training image using a teacher neural network for the given task to generate a pseudo-label and then uses the pseudo-label as the label for the training image for the given task.

The teacher neural network for a given task is a single-task neural network, i.e., that is configured to perform only the given task, that has been trained, e.g., through supervised learning or semi-supervised learning, on training data for the given task.

In some implementations, the system trains each of the teacher neural networks on supervised, i.e., labeled, training data or semi-supervised, i.e., a mix of labeled and unlabeled, training data prior to training the image representation neural network. For example, the system can train each teacher on the corresponding portion of the initial training data, i.e., the portion that includes ground-truth labels for the corresponding task and optionally some or all of the other data that does not have ground-truth labels for the corresponding task. In some other implementations, the system obtains pre-trained teacher neural networks that have already been trained by another system.

The teacher neural networks can have any appropriate architecture for performing the corresponding task. In some implementations, the teacher neural network for a given task can have the same architecture as the task neural network that includes the image representation neural network and the output head for the given task. That is, the task neural network and the teacher neural network have the same architecture and, therefore, the same number of parameters. In some other implementations, however, the two neural networks have different architectures, with the teacher neural network having a larger number of parameters than the task neural network. For example, the teacher can have a convolutional backbone that has more hidden layers, that has hidden layers that operate on feature maps with more channels, or both. In these cases, multiple larger, less computationally efficient teacher neural networks are used during training to improve the performance of a smaller, computationally efficient task neural network that can then be deployed, e.g., on an edge device or in another computing environment with limited computational budget. Thus, extra computational resources that are available at training time that may not be available after deployment can be successfully leveraged to improve the performance of the image representation neural network that fits within the computational budget afforded to processing new inputs at inference (after deployment).

For example, when the given task is a classification task, the system can use, as the pseudo-label, the score distribution over the categories generated by the teacher neural network for the given task.

As another example, when the given task is a segmentation task, the system can assign, for each pixel of the image, the category having the highest score in the score distribution generated by the teacher neural network for the given task for the pixel as long as the highest score exceeds a threshold, e.g., 0.3, 0.5, or 0.7. If the highest score does not exceed the threshold, the system can assign an "ignore" label to the pixel that indicates that no loss will be computed based on the prediction for that pixel.

As another example, when the given task is an object detection task, the system can assign, as the regions in the training image that depict objects, each region having a confidence score that exceeds a threshold, e.g., 0.3, 0.5, or 0.7, in the output for the teacher neural network.

As another example, when the given task is a depth prediction or normal prediction task, the system can assign, as the depth label or the normal label for each pixel, the depth prediction or normal prediction generated by the teacher neural network for the pixel.

Thus, in the final training data, each training image from the initial training data is associated with a respective label for each of the multiple tasks. Moreover, for at least some of the training images, the respective label for least one of the computer vision tasks is a pseudo-label. A pseudo-label for a given computer vision task is a label that is generated by processing the training image using a teacher neural network corresponding to the given computer vision task.

The system trains the image representation neural network jointly with a respective output neural network head for each of the multiple tasks on the final training data (step 206).

The system trains the neural network and the output heads across multiple training steps. At each training step, the system samples a batch of training data from the final training data and updates the values of the image representation parameters (and the parameters of the output heads) using the sampled batch.

Performing a training step is described in more detail below with reference to FIG. 3.

After the image representation has been trained, the system (or another system) can use the trained image representation neural network in any of a variety of ways.

For example, the system (or another system) can use the image representation neural network and the corresponding output head to perform one of the multiple different tasks on new images (step 208). That is, the task neural network made up of the image representation neural network and the corresponding output head can perform better on the computer vision task than the teacher neural network for the computer vision task, can be more computationally efficient than the teacher neural network, or both, making it advantageous to deploy the task neural network instead of the teacher neural network.

As another example, the system can obtain training data for a new computer vision task (step 210) and, after training the image representation neural network, train, on the training data for the new computer vision task, a new neural network that includes (i) the image representation neural network and (ii) a new output neural network head corresponding to the new computer vision task (step 212). The neural network is configured to generate outputs for the new computer vision task from feature representations for the new computer vision task that are generated from one or more of the feature maps generated by the image representation neural network. That is, the system can fine-tune the image representation neural network and a corresponding new output head for the new task on the new training data. This can allow the system to effectively perform the new task even if only a limited amount of training data for the new task is available by making use of the pre-trained image representation neural network. That is, the system starts the training of the new neural network starting from the updated image representation parameters after the training of the image representation neural network, allowing the training of the new neural network to benefit from the representations learned during the training performed in step 206.

Figure 3:
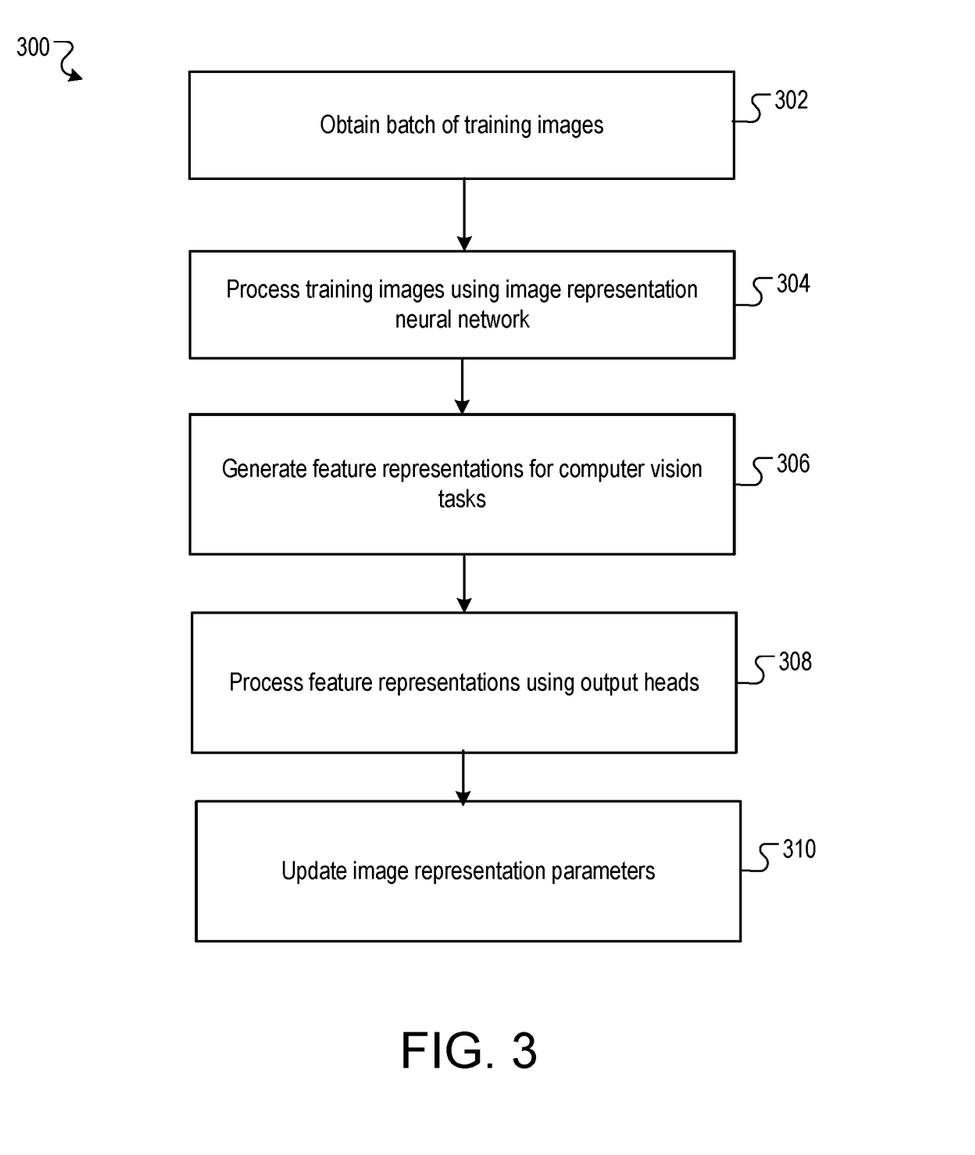
FIG. 3 is a flow diagram of an example process for performing a training step during the training of the image representation neural network.

FIG. 3 is a flow diagram of an example process 300 for performing a training step during the training of the image representation neural network. For convenience, the process 300 will be described as being performed by a system of one or more computers located in one or more locations. For example, a training system, e.g., the training system 100 of FIG. 1A, appropriately programmed, can perform the process 300.

The system can repeatedly perform iterations of the process 300 to repeatedly update the image representation parameters and the parameters of the output heads until a termination criterion has been satisfied, e.g., until a threshold number of iterations of the process 200 have been performed, until a threshold amount of wall clock time has elapsed, or until the values of the image representation parameters have converged.

In some implementations, the system performs iterations of the process 300 to train both the image representation neural network and the output head parameters from scratch, i.e., the system initializes the values of the image representation parameters and the output head parameters using a parameter initialization technique prior to performing the first iteration of the process 300.

In some other implementations, the system pre-trains the output heads on labeled training data prior to performing the first iteration of the process 300, i.e., as part of a different neural network.

At each training step, the system obtains a batch of training data that includes a plurality of training images and, for each of the training images, a respective label for each of a plurality of different computer vision tasks (step 302). A "label" for a given image for a given computer vision task is an output that should be generated by a neural network that is configured to perform the given computer vision task by processing the given image. Thus, each training image has multiple labels, one for each of multiple different computer vision tasks.

Moreover, as described above, for one or more of the plurality of training images, the respective label for least one of the computer vision tasks is a pseudo-label. A pseudo-label for a given computer vision task is a label that is generated by processing the training image using a teacher neural network corresponding to the given computer vision task, i.e., a teacher neural network that has already been trained to perform the given computer vision task. This is in contrast to a ground-truth label (or "supervised" label), which identifies an actual output for the given computer vision task as determined by an external source, e.g., a human user.

In some cases, for one or more of the training images, all of the labels for all of the tasks are pseudo-labels. In some cases, for one or more of the images, the image includes a ground-truth label for a single corresponding task and a pseudo-label for all of the other tasks.

Because all of the images in the final training data include a label for each task, the system can obtain the batch by sampling a fixed number of images uniformly at random from the final training data or by sampling using another scheme that does not need to account for which images have labels for which task.

The system then processes the training images using the image representation neural network in accordance with current values of the image representation parameters to generate a respective set of feature maps for each of the training images (step 304).

For each training image and for each of the plurality of different computer vision tasks, the system generates a feature representation for the training image and for the computer vision task from one or more of the feature maps for the image representation neural network (step 306). In some implementations, the plurality of tasks includes a respective task from each of the categories described above.

That is, for a single image, the system generates multiple different feature representations, one for each of the multiple computer vision tasks. The feature representations for different types of computer vision tasks can be different but can be generated from the same set of feature maps. Example techniques for generating feature representations are described above.

For each task, the system then processes the feature representations for the training images in the batch using an output neural network head corresponding to the computer vision task to generate a predicted output for the computer vision task (step 308).

An output neural network head is a collection of one or more neural network layers that are configured to receive the feature representation for the corresponding task and to generate a predicted output for the corresponding task. That is, each computer vision task has a corresponding, different output head and the system generates the output for the computer vision task by processing the feature representation for the computer vision task using the output head for the computer vision task.

The system updates the image representation parameters by computing a gradient with respect to the image representation parameters of an overall loss function that includes a respective task-specific loss function for each of the plurality of computer vision tasks (step 310). For example, the overall loss function can be an average or a weighted average of the task-specific loss functions.

The task-specific loss function for a given task measures, for each training image, an error between (i) the predicted output for the given computer vision task for the training image and (ii) the respective label for the given computer vision task for the training image.

To compute the gradient with respect to the image representation parameters of the overall loss function, for each task, the system backpropagates gradients of the task-specific loss function for the task through the corresponding output neural network head and into the image representation neural network.

The system can then use an optimizer, e.g., SGD, Adam, or rmsProp to update the current values of the image representation parameters using the gradients, i.e., can apply the optimizer to the gradients to update the image representation parameters.

For each task, the system also updates the parameters of the corresponding output neural network head for the task by computing gradients with respect to the parameters of the corresponding output neural network head of the task-specific loss function for the task and then applying an optimizer, i.e., the same optimizer as used for the image representation parameters or a different optimizer, to the gradients.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a sub combination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for training an image representation neural network having a plurality of image representation parameters, wherein the image representation neural network is configured to receive as input an image and to process the image in accordance with the image representation parameters to generate as output a set of feature maps characterizing the image, the method comprising repeatedly performing operations comprising:

obtaining training data comprising a plurality of training images and, for each of the training images, a respective label for each of a plurality of different computer vision tasks, wherein:

for one or more of the plurality of training images, the respective label for least one of the computer vision tasks is a pseudo-label that is generated by processing the training image using a teacher neural network that corresponds to the computer vision task and that has already been trained to perform the computer vision task;

processing the training images using the image representation neural network to generate a respective set of feature maps for each of the training images;

for each training image and for each of the plurality of different computer vision tasks:

generating a feature representation for the training image and for the computer vision task from one or more of the feature maps for the image representation neural network; and processing the feature representation using an output neural network head corresponding to the computer vision task to generate a predicted output for the computer vision task; and updating the image representation parameters by computing a gradient with respect to the image representation parameters of an overall loss function that includes a respective task-specific loss function for each of the plurality of computer vision tasks that measures, for each training image, an error between (i) the predicted output for the computer vision task for the training image and (ii) the respective label for the computer vision task for the training image.

2. The method of claim 1, further comprising:
obtaining training data for a new computer vision task, the training data comprising a plurality of new images and, for each of the new images, a respective label for the new computer vision task; and
after training the image representation neural network, training, on the training data for the new computer vision task, a new neural network that includes (i) the image representation neural network and (ii) a new output neural network head corresponding to the new computer vision task and that is configured to generate outputs for the new computer vision task from feature representations for the new computer vision task that are generated from one or more of the feature maps generated by the image representation neural network.

3. The method of claim 2, wherein training the new neural network comprises training the image representation neural network starting from the updated image representation parameters after the training of the image representation neural network.

4. The method of claim 1, wherein the overall loss function is an average or a weighted average of the task-specific loss functions.

5. The method of claim 1, wherein computing a gradient with respect to the image representation parameters of an overall loss function comprises:
for each task, backpropagating gradients of the task-specific loss function for the task through the corresponding output neural network head and into the image representation neural network.

6. The method of claim 1, wherein:
at least some of the training images in the training data each correspond to a respective one of the computer vision tasks, and
for each training image that corresponds to a respective one of the computer vision tasks, (i) the respective label for the training image for the corresponding computer vision task is a ground truth label for the training image in a set of supervised training data for the corresponding computer vision task and (ii) the respective labels for the training image for each other computer vision task in the plurality of computer vision tasks are pseudo-labels that are generated by processing the training image using a teacher neural network for the computer vision task.

7. The method of claim 6, wherein different training images have different corresponding computer vision tasks.

8. The method of claim 6, wherein, for each computer vision task, the teacher neural network for the computer vision task has been trained on the supervised training data for the computer vision task.

9. The method of claim 1, the operations further comprising:
for each task, updating parameters of the corresponding output neural network head by computing gradients with respect to the parameters of the corresponding output neural network head of the task-specific loss function for the task.

10. The method of claim 9, further comprising:
after training the image representation neural network, receiving a new image; and
performing one of the computer vision tasks on the new image by:
processing the new image using the image representation neural network in accordance with the updated image representation parameters after the training of the image representation neural network to generate a set of feature maps for the new image;
generating a feature representation for the new image from one or more of the feature maps for the new image; and
processing the new image using the corresponding output neural network head for the computer vision task in accordance with the updated parameters of the corresponding output neural network head after the training of the image representation neural network to generate a predicted output for the computer vision task for the new image.

11. The method of claim 1, wherein the plurality of computer vision tasks include two or more of an image classification task, a semantic segmentation task, an object detection task, an instance segmentation task, a surface normal prediction task, or an image depth prediction task.

12. The method of claim 1, wherein, for one or more of the plurality of training images, the respective labels for all of the computer vision tasks are pseudo-labels.

13. The method of claim 1, further comprising:
for each of the training images and for each of the at least one of the tasks, generating the pseudo-label for the task by processing the training image using the teacher neural network corresponding to the computer vision task.

14. The method of claim 1, further comprising:
for each of the plurality of computer vision tasks, training the teacher neural network corresponding to the computer vision task on supervised or semi-supervised training data for the computer vision task.

15. The method of claim 1, wherein the set of feature maps includes, for each of a plurality of spatial resolutions, a set of one or more feature maps having the spatial resolution.

16. The method of claim 15, wherein the plurality of tasks includes an image classification task, and wherein generating the feature representation for the training image and for the image classification task comprises using one of the feature maps having the lowest spatial resolution as the feature representation.

17. The method of claim 15, wherein the plurality of tasks includes an object detection or instance segmentation task, and wherein generating the feature representation for the training image and for the object detection or instance segmentation task comprises using a feature representation that includes a respective feature map having each of the spatial resolutions.

18. The method of claim 15, wherein the plurality of tasks includes a per-pixel prediction task, and wherein generating the feature representation for the training image and for the per-pixel prediction task comprises generating the feature representation by fusing respective feature maps having each of the spatial resolutions.

19. One or more non-transitory computer-readable storage media storing instructions that when executed by one or more computers cause the one or more computers to perform operations for training an image representation neural network having a plurality of image representation parameters, wherein the image representation neural network is configured to receive as input an image and to process the image in accordance with the image representation parameters to generate as output a set of feature maps characterizing the image, the training comprising repeatedly performing operations comprising:

obtaining training data comprising a plurality of training images and, for each of the training images, a respective label for each of a plurality of different computer vision tasks, wherein, for each of the plurality of training images, the respective label for least one of the computer vision tasks is a pseudo-label that is generated by processing the training image using a teacher neural network corresponding to the computer vision task and that has already been trained to perform the computer vision task;

processing the training images using the image representation neural network to generate a respective set of feature maps for each of the training images;

for each training image and for each of the plurality of different computer vision tasks:

generating a feature representation for the training image and for the computer vision task from one or more of the feature maps for the image representation neural network; and  processing the feature representation using an output neural network head corresponding to the computer vision task to generate a predicted output for the computer vision task; and  updating the image representation parameters by computing a gradient with respect to the image representation parameters of an overall loss function that includes a respective task-specific loss function for each of the plurality of computer vision tasks that measures, for each training image, an error between (i) the predicted output for the computer vision task for the training image and (ii) the respective label for the computer vision task for the training image.

20. A system comprising one or more computers and one or more storage devices storing instructions that when executed by the one or more computers cause the one or more computers to perform operations for training an image representation neural network having a plurality of image representation parameters, wherein the image representation neural network is configured to receive as input an image and to process the image in accordance with the image representation parameters to generate as output a set of feature maps characterizing the image, the training comprising repeatedly performing operations comprising:

obtaining training data comprising a plurality of training images and, for each of the training images, a respective label for each of a plurality of different computer vision tasks, wherein, for each of the plurality of training images, the respective label for least one of the computer vision tasks is a pseudo-label that is generated by processing the training image using a teacher neural network corresponding to the computer vision task and that has already been trained to perform the computer vision task;

processing the training images using the image representation neural network to generate a respective set of feature maps for each of the training images;

for each training image and for each of the plurality of different computer vision tasks:

generating a feature representation for the training image and for the computer vision task from one or more of the feature maps for the image representation neural network; and  processing the feature representation using an output neural network head corresponding to the computer vision task to generate a predicted output for the computer vision task; and  updating the image representation parameters by computing a gradient with respect to the image representation parameters of an overall loss function that includes a respective task-specific loss function for each of the plurality of computer vision tasks that measures, for each training image, an error between (i) the predicted output for the computer vision task for the training image and (ii) the respective label for the computer vision task for the training image.

\* \* \* \* \*